A. ARENT.
PROTECTIVE TREATMENT OF MATERIALS.
APPLICATION FILED SEPT. 20, 1918.
1,388,824. Patented Aug. 23, 1921.
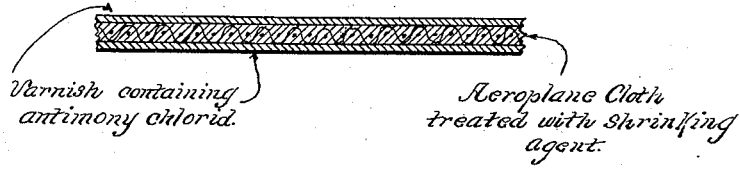
Varnish containing antimony chlorid.
Aeroplane Cloth treated with Shrinking agent.
Inventor:
Arthur Arent
by R.F. Cleward
his atty.

UNITED STATES PATENT OFFICE.

ARTHUR ARENT, OF DES MOINES, IOWA.

PROTECTIVE TREATMENT OF MATERIALS.

1,388,824. Specification of Letters Patent. Patented Aug. 23, 1921.

Application filed September 20, 1918. Serial No. 254,958.

*To all whom it may concern:*

Be it known that I, ARTHUR ARENT, a citizen of the United States, residing at Des Moines, in the county of Polk and State of Iowa, have invented certain new and useful Improvements in Protective Treatment of Materials; and I do hereby declare the following to be a full, clear, and exact description of the invention, such as will enable others skilled in the art to which it appertains to make and use the same.

This invention relates to protective treatment of materials for the purpose of preserving and waterproofing the same and rendering them relatively non-inflammable. More particularly, the invention relates to waterproofing and fireproofing fibrous materials such as canvas, duck, and other textile fabrics, and especially cloth used for aeroplane wings, hangar tents, balloons, etc.

Briefly stated, the invention in so far as it relates to a process, comprises, broadly, applying to objects or materials a protective agent comprising a compound of a metal, ordinarily a fire-retardant metallic salt, most desirably in substantially anhydrous condition and capable, upon suitable subsequent treatment, of yielding an oxid or a basic salt which is practically insoluble in water, said oxid or basic salt being also a fire retardant and rendering the material non-inflammable or decreasing its inflammability, depending upon the particular procedure followed. In conjunction with said metal compound, a waterproofing agent is also applied to the material under treatment, where waterproofing is required. Most desirably the waterproofing agent and the metallic salt are applied simultaneously in the form of a solution comprising said waterproofing agent and metallic salt dissolved in a suitable menstruum which may either be a common solvent for both said ingredients, or a mixture of solvents, accompanied or not by other ingredients suitable for the particular object in view.

The invention also comprises novel compositions of matter in the nature of waterproofing and fireproofing mixtures useful in carrying out the method briefly described above and more particularly hereinafter explained.

In order to afford a complete understanding of the principles of the invention, typical embodiments thereof will be hereinafter set forth in detail; but it is to be understood that the invention in its broader aspects is not limited to such details.

In accordance with the best mode of practising the invention now known to me, the metallic salt to be used for fireproofing purposes is dissolved in a non-aqueous solvent in which said salt is soluble. By non-aqueous solvent is here meant a solvent which is composed wholly or largely of a liquid other than water. If water is present at all in such solvent, it should be present in proportions insufficient to cause substantial hydrolyzation or decomposition of the salt employed and consequent deposition of an insoluble oxid or basic salt. Generally speaking, metallic salts suitable for use in the present process are those which upon treatment with $H_2O$, either in the form of liquid, vapor, or steam, are decomposed and yield a substantially water-insoluble oxid or basic salt, such as an oxysalt. Antimony salts are especially adapted for use in the present process and are preferred herein for certain specific purposes; but salts of other metals such as zinc, tin, and the like, may be employed under some conditions. Salts of zinc and tin, such as the chlorids, being soluble in water, are sharply distinguishable from salts of the antimony type, however, which latter are not soluble in water to a substantial extent but are immediately decomposed thereby, yielding insoluble oxy-compounds at once. Where an antimony salt is used, antimony trichlorid is especially desirable.

In preparing a typical composition or "dope" within the scope of the invention, I prepare a saturated solution of antimony trichlorid in a volatile carbon chlorid solvent, carbon tetrachlorid offering special advantages for this purpose and being usually employed in practice. Chloroform is also an excellent solvent for this purpose, but is more expensive and less safe to handle. If the material to be fireproofed is also to be waterproofed, a waterproofing agent is most desirably incorporated in the solution in commixture with the antimony salt. The particular waterproofing agent to be used depends upon the character of the material to be treated and the purposes for which it is intended. In general a vulcanizable gum of the caoutchouc type is suitable; but for some classes of work, especially aeroplane work, gutta percha offers distinct advantages and is much to be preferred. Among other things, the presence of the gutta percha gives the coating solution a brownish tinge which is desirable in that it apparently aids to a certain extent in protecting the underlying coating of cellulose ester, with which aeroplane wings are commonly provided, from the destructive action of certain actinic light rays. Gutta percha, especially in sheet or tissue form is readily soluble in carbon tetrachlorid and it is taken up readily by carbon tetrachlorid saturated with antimony chlorid; so that in this instance a single solvent serves admirably in preparing a mixed solution of gutta percha and antimony trichlorid. It is to be understood that the gutta percha may also be used in chip or other form. The amount of waterproofing agent employed, specifically gutta percha in this instance, may vary widely, but in practice I have found from one to two ounces of gutta percha per pound of tetrachlorid to give good results. To some extent, the amount of gutta percha used will be determined by the desired consistency of the mixture. The mixture should be fluent enough to spread well under the brush, if it is to be applied by brush; and similarly, where it is applied by other methods, such as spraying, dipping, etc., the proportions in which the gutta percha may be employed to advantage will be governed partly by well known practical considerations involved in such methods. Assuming, for example, that untreated cloth or other fibrous material is to be protected, the mixture thus prepared may be applied to the cloth or other fibrous material in any desired manner, as by brushing on, for example. After the mixture has been applied to the cloth, the volatile solvent is removed either by allowing it to evaporate spontaneously or by a special drying treatment, recovery of the solvent by any well known or suitable method being ordinarily desirable. After evaporation of the solvent, the cloth may advantageously be subjected, most desirably at once, to the hydrolyzing action of moisture. A convenient way to effect this is to immerse the cloth in water for a suitable period of time which may vary according to the nature and consistency of the mixture or "dope" used. Ordinarily an immersion of from 10 to 30 minutes suffices in actual practice As a result of this treatment, more or less of the antimony trichlorid undergoes hydrolyzation, especially at the surface of the coating with the formation of basic chlorids or oxy-salts, the decomposition probably going even to the oxid to some extent. These basic salts and the oxid or oxids thus formed are substantially insoluble in water, they adhere tenaciously to the article whether accompanied by a waterproofing agent or not, and especially when such agent is used, and they, as well as whatever portion of the antimony chlorid that persists unchanged, are excellent fire retardants. Furthermore, if the cloth is subsequently exposed to weather in actual use, as is the case with canvas or duck for tents, hangars, etc., the formation of these basic salts and oxids in the coating or impregnating substance may be more or less progressive, assuming that the decomposition of the antimony trichlorid occurs principally in the outer and exposed surfaces of the fabric as a result of the first treatment with water. Irrespective of whether much oxidation does actually occur or not, it is a fact that fabric treated as described is rendered non-inflammable; and my invention is therefore based on the observed facts rather than upon any theory as to exactly what chemical change, if any, is undergone by the antimony chlorid. In cases where the use of steam is feasible, the evaporation of the solvent and the decomposition of the antimony trichlorid can be effected simultaneously, the recovery of the solvent being also readily carried out by known methods, or circulation of warm moist air in contact with the treated cloth may be resorted to.

A highly important practical application of the invention is in connection with aeroplane manufacture. In making aeroplanes according to the practice heretofore prevailing, the linen or cotton cloth used for the wings is carefully stretched on the wing frames and is then treated in place with a shrinking agent to obtain maximum tautness; and this shrinking agent is usually cellulose acetate or other suitable cellulose ester, in the form of a varnish-like solution, of which several coats are applied, ordinarily three. After this treatment, the taut cloth is then given a final protective coating of high grade aeroplane varnish, such as an outside spar varnish of the best quality. Both the cellulose ester and the varnish employed, as well as the cloth itself, if untreated, are very inflammable; and even when the cloth has been treated with a fireproofing or fire-retarding agent, the combination nevertheless burns quite freely owing to the high combustibility of the coating materials employed. It has also been proposed to mix a fire-retarding filler, such as ocher or the like, with the varnish; but even this has failed to prevent relatively high inflammability of the treated cloth, and the addition of a heavy inert filler such as ocher has the further disadvantage of unduly increasing the weight. In accordance with the present invention, the final exterior coat of ordinary spar varnish heretofore employed on the aeroplane wings is replaced by a coating of varnish-like material which comprises as an essential ingredient a metallic salt of the character hereinbefore described, antimony trichlorid in this specific instance, said coating usually being subsequently treated to develop more fully its fireproofing capabilities. The best mode of effecting this is to mix with the carbon tetrachlorid solution of antimony trichlorid and gutta percha previously described, about an equal volume of good outside spar varnish, although it is to be understood that the proportions may be varied. This mixture is then brushed on to the cloth which has previously been treated with cellulose acetate. The resultant treated fabric is shown diagrammatically in the accompanying drawing, which is to be understood as not restricting the scope of the invention to the particular article shown, but as merely illustrating one particularly desirable specific form which the broad invention may take. In this drawing no attempt is made to show the cloth or coatings to scale or necessarily in correct relative proportions. By proceeding in this manner, even where the cloth itself has not been treated with a fire retardant, the inflammability of the shrunk and varnished cloth is very much less than that of aeroplane wing cloth treated according to methods heretofore known. It is to be noted that in this case, the fire-retarding effect is due practically exclusively to an exterior protecting layer on the fabric as distinguished from impregnation of the fabric itself, and that the broad invention extends therefore to protectively coating bodies or objects which are not necessarily fibrous or absorbent. Most desirably, however, in treating aeroplane wings in accordance with the invention, the cloth itself is also treated directly with a fireproofing agent or fire retardant prior to coating it with cellulose acetate. The invention is not limited in its broader aspects to the employment of any particular fire retardant for this purpose but impregnation of the cloth with a carbon tetrachlorid solution of antimony trichlorid, followed by treatment with moisture, is very effective in rendering the cloth non-inflammable. Another fire retardant proposed as adapted to give satisfactory results is disclosed and claimed in co-pending applications of myself and another, Serial No. 94,245, filed April 28, 1916 and Serial No. 193,975, filed September 29, 1917. Said fire retardant consists essentially of a relatively concentrated and somewhat ammoniacal solution of a zinc salt, usually zinc chlorid, accompanied by ammonium chlorid, the zinc probably being present to a considerable extent in the form of a zincate. When this retardant is applied to cloth, and the cloth allowed to dry, substantially insoluble basic zinc compounds are deposited in and on the fiber which adhere tenaciously and render the treated cloth positively non-inflammable. Cloth so treated merely chars when subjected to the action of a flame. Cloth fireproofed in this manner, or in any other suitable way, and then coated with a cellulose ester and an outside protective coating of the described varnish mixture containing antimony trichlorid in accordance with the present invention, is also positively non-inflammable and merely chars when subjected to the direct action of a flame.

In some cases it is advisable to entirely omit the spar varnish and to employ as the final exterior coating for the wing cloth simply the solution of gutta percha and antimony trichlorid.

While a mixture comprising both gutta percha and a spar varnish, in company with antimony trichlorid has been found of particular value, the invention in its broader aspects extends to similar mixtures not including gutta percha or rubber, but comprising varnish gums or resins, cellulose esters, or the like, which may be generically designated varnish bases.

In the foregoing description carbon tetrachlorid and chloroform have been referred to as suitable solvents to employ in preparing the novel compositions herein disclosed, but the invention is naturally not restricted in this respect. Thus in using anhydrous zinc chlorid or antimony triiodid as ingredients, for example, carbon disulfid can be used as a solvent for both these salts and also for rubber, gutta percha, or the like, in preparing solutions of the desired character.

Reference in the appended article claims to a hydrolyzable metal compound is intended in a broad sense to designate not only such compound *per se* but also derivatives thereof resulting from more or less complete hydrolyzation of such compound.

Certain matter disclosed herein but not specifically claimed forms the subject matter of continuing and divisional applications filed by me, as follows: Serial No. 275,242, filed February 5, 1919; and Serial Nos. 441,081, 441,082 and 441,083, filed January 29, 1921.

What I claim is:

1. The process of protectively treating material which comprises applying thereto a hydrolyzable compound of a metal in substantially anhydrous condition and then subjecting the thus prepared material to the action of a hydrolyzing agent.

2. The process of protectively treating material which comprises applying thereto a hydrolyzable compound of a metal dissolved in a non-aqueous solvent and subsequently subjecting the thus prepared material to the action of $H_2O$.

3. The process of protectively treating material which comprises applying thereto a hydrolyzable compound of a metal dissolved in a volatile non-aqueous solvent, and after evaporation of said solvent, subjecting the thus prepared material to the action of $H_2O$.

4. The process of protectively treating material which comprises applying thereto a substantially anhydrous salt of a metal capable of forming by reaction with water a substantially water-insoluble basic salt or oxid, and subjecting the thus prepared material to the action of $H_2O$.

5. The process of protectively treating material which comprises applying thereto a solution of an antimony compound in a volatile non-aqueous solvent, and subjecting the thus prepared material to the action of $H_2O$.

6. The process of protectively treating material which comprises applying thereto a solution of antimony trichlorid in carbon tetrachlorid, evaporating off the solvent, and subjecting the thus prepared material to the action of moisture.

7. The process of protectively treating material which comprises applying thereto a solution containing a gum and a hydrolyzable metal salt, and then subjecting the thus prepared material to the action of a hydrolyzing agent.

8. The process of protectively treating material which comprises applying thereto a solution containing a vulcanizable gum and a hydrolyzable metal salt, and then subjecting the thus prepared material to the action of a hydrolyzing agent.

9. The process of protectively treating material which comprises applying thereto a solution of a varnish base and a hydrolyzable compound of a metal in a non-aqueous solvent, and then subjecting the thus prepared material to the action of moisture.

10. The process of protectively treating cloth or other fibrous material which comprises applying thereto a solution of gutta percha and antimony trichlorid in carbon tetrachlorid, and thereafter subjecting the thus prepared material to the action of moisture.

11. The process of protectively treating cloth or other fibrous material which comprises applying thereto a solution of a varnish gum, gutta percha, and antimony trichlorid in carbon tetrachlorid, evaporating off the solvent, and subjecting the thus prepared material to the action of moisture.

12. In the treatment of cloth for aeroplanes and the like, the process which comprises applying a shrinking agent to said cloth while in stretched condition, then coating with a dope comprising a fluent mixture of a gum and a hydrolyzable compound of a metal, and subjecting the coated cloth to the action of moisture, substantially as set forth.

13. In the treatment of cloth for aeroplanes and the like, the process which comprises applying a shrinking agent to said cloth while in stretched condition, then coating with a varnish containing antimony trichlorid, and subjecting the coated cloth to the action of moisture, substantially as set forth.

14. In the treatment of cloth for aeroplanes and the like, the process which comprises applying a shrinking agent to said cloth while in stretched condition, then coating with a mixture comprising spar varnish, gutta percha and antimony trichlorid, and subjecting the coated cloth to the action of moisture, substantially as set forth.

15. In a process of protectively treating fabric or the like, the step which comprises applying thereto a mixture of a waterproofing agent and a fire-retardant hydrolyzable compound of a metal, the latter being employed in sufficient quantity to render the resultant treated fabric substantially non-inflammable.

16. In the treatment of cloth for aeroplanes and the like, the process which comprises applying a shrinking agent to said cloth while in stretched condition, then coating with a mixture comprising a waterproofing agent and a hydrolyzable compound of a metal, and subjecting the coated cloth to the action of moisture, substantially as set forth.

17. In the treatment of cloth for aeroplanes and the like, the process which comprises applying a shrinking agent to said cloth while in stretched condition, then coating with a mixture comprising gutta percha and antimony trichlorid, and subjecting the coated cloth to the action of moisture, substantially as set forth.

18. In the treatment of cloth for aeroplanes and the like, the process which comprises treating cloth with a fire retardant, then applying a shrinking agent to the cloth, coating with a mixture comprising spar varnish, gutta percha and antimony trichlorid, and subjecting the coated cloth to the action of moisture, substantially as set forth.

19. In a process of protectively treating material, the step of applying to the material a fire-retardant hydrolyzable compound of a metal dissolved in a non-aqueous solvent.

20. In a process of protectively treating material, the step of applying to the material a solution of an antimony compound in a volatile non-aqueous solvent, said antimony compound being employed in quantity sufficient to render said material substantially non-inflammable.

21. In a process of rendering material less inflammable, the step of applying to the material a solution of antimony trichlorid in a non-aqueous solvent.

22. As a new article of manufacture, the combination, with a normally inflammable material, of a waterproofing agent and a fire-retardant hydrolyzable compound of a metal associated with said material, the combination being water-repellent and non-inflammable.

23. As a new article of manufacture, the combination, with a normally inflammable material, of a waterproofing agent and a fire-retardant water-insoluble antimony salt associated with said material, the combination being water repellent and non-inflammable.

24. As a new article of manufacture, cloth carrying an adherent mixture of a gum and a fire-retardant hydrolyzable compound of a metal, the combination being non-inflammable.

25. As a new article of manufacture, cloth for aeroplanes and the like comprising a fabric base carrying a shrinking agent and coated with a mixture of a gum and a hydrolyzable compound of a metal.

26. As a new article of manufacture, cloth for aeroplanes and the like comprising a fabric base carrying a shrinking agent and coated with a mixture of a varnish containing gutta percha and a chlorid of antimony.

In testimony whereof I hereunto affix my signature.

ARTHUR ARENT.